(12) United States Patent
Tschantz

(10) Patent No.: US 6,523,726 B1
(45) Date of Patent: Feb. 25, 2003

(54) APPARATUS AND METHOD FOR CONTROLLED FEEDING OF PARTICULATE MATERIAL

(75) Inventor: Richard W. Tschantz, Louisville, OH (US)

(73) Assignee: Imperial Technologies, Inc., N. Canton, OH (US)

( * ) Notice: Subject to any disclaimer, the term of this patent is extended or adjusted under 35 U.S.C. 154(b) by 0 days.

(21) Appl. No.: 09/579,969

(22) Filed: May 26, 2000

(51) Int. Cl.$^7$ ............................................... B65G 65/48
(52) U.S. Cl. ..................... 222/353; 222/342; 222/367; 222/368; 222/410; 222/414
(58) Field of Search ............................... 222/342, 353, 222/367, 368, 410, 414

(56) References Cited

U.S. PATENT DOCUMENTS

| | | | | |
|---|---|---|---|---|
| 435,598 A | * | 9/1890 | Fletcher | 222/368 |
| 684,346 A | * | 10/1901 | Bowsher | 222/410 |
| 1,040,888 A | * | 8/1912 | Comrie | 222/414 |
| 1,300,441 A | | 4/1919 | Marsa | 222/199 |
| 2,030,541 A | * | 2/1936 | Rose | 222/342 |
| 3,574,411 A | * | 4/1971 | Miller | 222/365 |
| 3,738,507 A | * | 6/1973 | Livingston | 222/457 |
| 3,776,430 A | | 12/1973 | Grandrud | 222/177 |
| 3,830,357 A | * | 8/1974 | West et al. | 198/527 |
| 4,163,489 A | | 8/1979 | Wahl | 198/505 |
| 4,516,674 A | | 5/1985 | Firth | 198/617 |
| 5,437,393 A | * | 8/1995 | Blicher et al. | 222/77 |
| 5,485,909 A | | 1/1996 | Hay | 198/642 |
| 5,516,011 A | * | 5/1996 | Fielding | 222/342 |

FOREIGN PATENT DOCUMENTS

EP 178005 * 4/1986 ................. 414/355

* cited by examiner

Primary Examiner—J. Casimer Jacyna
(74) Attorney, Agent, or Firm—Sand & Sebolt

(57) ABSTRACT

An apparatus for feeding a particulate material. There is a drum having a peripheral surface and a central axis which is rotatable about its central axis. There is a first particulate material retaining wall which has an inner and outer edge. This wall is positioned such that said outer edge is remote from the peripheral surface of the drum and the inner edge is adjacent the peripheral surface of the drum. The inner edge is moveable from said peripheral surface of said drum. A second particulate material retaining wall having an inner and outer end and positioned such that said outer end is remote from the peripheral surface of the drum and the outer end is remote from the peripheral surface with the drum. The first particulate retaining wall is preferably spaced from the peripheral surface of the drum by a distance which corresponds to the angle of repose of the particulate material being used.

23 Claims, 14 Drawing Sheets

APPARATUS AND METHOD FOR CONTROLLED FEEDING OF PARTICULATE MATERIAL

BACKGROUND OF THE INVENTION

1. Technical Field

The present invention relates to apparatus and methods for conveying particulate material and, in particular, to apparatus and methods for feeding and metering particulate material. More particularly, the present invention relates to apparatus and methods for feeding and metering particulate material which are capable of adjustment to accommodate a range of different particulate materials.

2. Background Information

The transportation and movement of particulate materials such as sugar, breakfast cereal, dog food, and the like, presents special problems inasmuch as such materials often display different static characteristics.

U.S. Pat. No. 4,163,489 to Wahl discloses a feeder apparatus in which bulk materials, in fibrous or stringy form, is delivered onto an endless belt by means of a rotating rake. The weight of the material on the belt is sensed by a transducer which effects the operation of a control system for automatically adjusting the belt speed to maintain a constant discharge of the material from an end of the belt. Excess material deposited on the belt is returned to the hopper by the rotating rake.

U.S. Pat. No. 5,485,909 to Hay discloses an apparatus for transporting and metering particulate material including a transport channel having an inlet and an outlet. The transport channel is formed between substantially opposed faces of first and second rotary disks movable between the inlet and outlet towards the outlet and at least one arcuate wall extending between the inlet and outlet. The apparatus further includes a device provided adjacent the inlet for preventing a dead area from being formed to thereby provide a constant and uniform flow of the particulate solids within the apparatus.

A need still exists for an apparatus and method for feeding and metering particulate material which affords a simple and inexpensive way to adjust operation of the apparatus and method based on differences in characteristics between different types of particulate materials.

SUMMARY OF THE INVENTION

It is an object of the present invention to provide an apparatus and method for feeding and metering particulate material in which an easy and inexpensive means for adjustment is provided based on differences in characteristics between different types of particulate materials.

It is another object of the present invention to provide an easy, inexpensive and effective means of sealing the lower edge of a particulate material sealing plate against a surface, and particularly against a curved surface.

It is still another object of the present invention to provide an easy, inexpensive and effective means of sealing a rotating shaft, and particularly for sealing a rotating shaft having a cylindrical member mounted thereon.

The present invention is an apparatus for feeding a particulate material. There is a drum having a peripheral surface and a central axis which is rotatable about its central axis. There is a first particulate material retaining wall which has an inner and outer edge. This wall is positioned such that said outer edge is remote from the peripheral surface of the drum and the inner edge is adjacent the peripheral surface of the drum. The inner edge is moveable from said peripheral surface of said drum. A second particulate material retaining wall having an inner and outer end and positioned such that said outer end is remote from the peripheral surface of the drum. The first particulate retaining wall is preferably spaced from the peripheral surface of the drum by a distance which corresponds to the angle of repose of the particulate material being used.

Also encompassed by the present invention is an apparatus for feeding a particulate material which includes a rotatable drum having a direction of rotation, a peripheral surface having an upper side and a longitudinal axis, and having a generally conically shaped body of particulate material positioned on said upper side of the peripheral surface. The conically shaped body of particulate material having an apex and base, a sloped side and having a forward side in the direction of rotation of the drum and an opposed rearward side. There is also a first particulate material retaining means having an inner edge and an outer edge. This first particulate retaining means is positioned such that said inner edge of said first particulate retaining means is spaced from the peripheral surface of the drum by a distance sufficient so that said inner edge is positioned approximately on the front sloped side of the conically sloped body of particulate material. There is also a second particulate material retaining means having an inner edge and an outer edge. The second particulate material retaining means is positioned such that said inner edge of said second particulate material retaining means is adjacent the peripheral surface of the drum and said second particulate material retaining means is positioned in rearward relation to the apex of the conically sloped body of particulate material.

Also encompassed by the present invention is an apparatus for feeding a particulate material which includes a generally cylindrical drum having a peripheral surface having an upper side and a longitudinal axis. There is a body of a particulate material positioned on said upper side of said peripheral surface. This body of particulate material has a surface with a center point and a sloped line extending from said center point which is tangent to the peripheral surface of the drum or a parallel to a line which is tangent to the peripheral surface of the drum. There is also a horizontal line tangent to the peripheral surface of the drum which forms with the sloped line an acute angle. The particulate material has a characteristic angle of repose which is approximately equal to this acute angle. There is also a first particulate material retaining means having an inner edge and an outer edge. This first particulate material retaining means is positioned such that said inner edge of said first particulate retaining means is spaced from the peripheral surface of the drum by a distance sufficient so that this inner edge is positioned approximately on the sloped line extending from said center point of the surface of the particulate material which is tangent to the peripheral surface of the drum. This is also a second particulate material retaining means positioned adjacent the body of particulate material in opposed relation to the first particulate material retaining means. Means are also provided for rotating the drum about its longitudinal axis in a direction from the center point of the surface of the center point of the surface of the particulate material toward the first particulate material retaining means.

The present invention also encompasses a method for feeding a particulate material. A rotatable drum which has a direction of rotation, a peripheral surface having an upper side and a longitudinal axis, is provided. A conically shaped body of particulate material is positioned on said upper side of the peripheral surface, and this conically shaped body of particulate material having an apex and base, a sloped side and having a forward side in the direction of rotation of the drum and an opposed rearward side. A first particulate material retaining means having an inner edge and an outer edge is provided. The inner edge of said first particulate retaining means is spaced from the peripheral surface of the drum by a distance sufficient so that said inner edge is positioned approximately on the front sloped side of the conically sloped body of particulate material. A second particulate material retaining means having an inner edge and an outer edge provided and positioned such that said inner edge of said second particulate material retaining means is adjacent the peripheral surface of the drum and is positioned in no rearward relation to the apex of the conically sloped body of particulate material. The drum is then rotated about its longitudinal axis in the direction of rotation.

Also encompassed by the present invention is a structure and method for sealing a lateral plate at least partially surrounding a body of a particulate material. The particulate material is superimposed on a base surface. The lateral plate is seated on the base surface on the rear corner between its inner edge and rear surface. The inner edge of the lateral plate is angularly disposed to the base surface by an angle which is approximately equal to the angle of repose of the particulate material.

The present invention also encompasses a seal for a rotatable on which a cylindrical member is mounted. Adjacent the ends of the rotatable shaft there is a stationary seal wall which is cross sectionally curved preferably the wall has a repeating curved pattern such as a sinusoidal pattern.

BRIEF DESCRIPTION OF THE DRAWINGS

The preferred embodiment of the invention, illustrative of the best mode in which applicant contemplated applying the principles, is set forth in the following description and is shown in the drawings and is particularly and distinctly pointed out and set forth in the appended claims.

DESCRIPTION OF THE PREFERRED EMBODIMENTS

Figure 1:
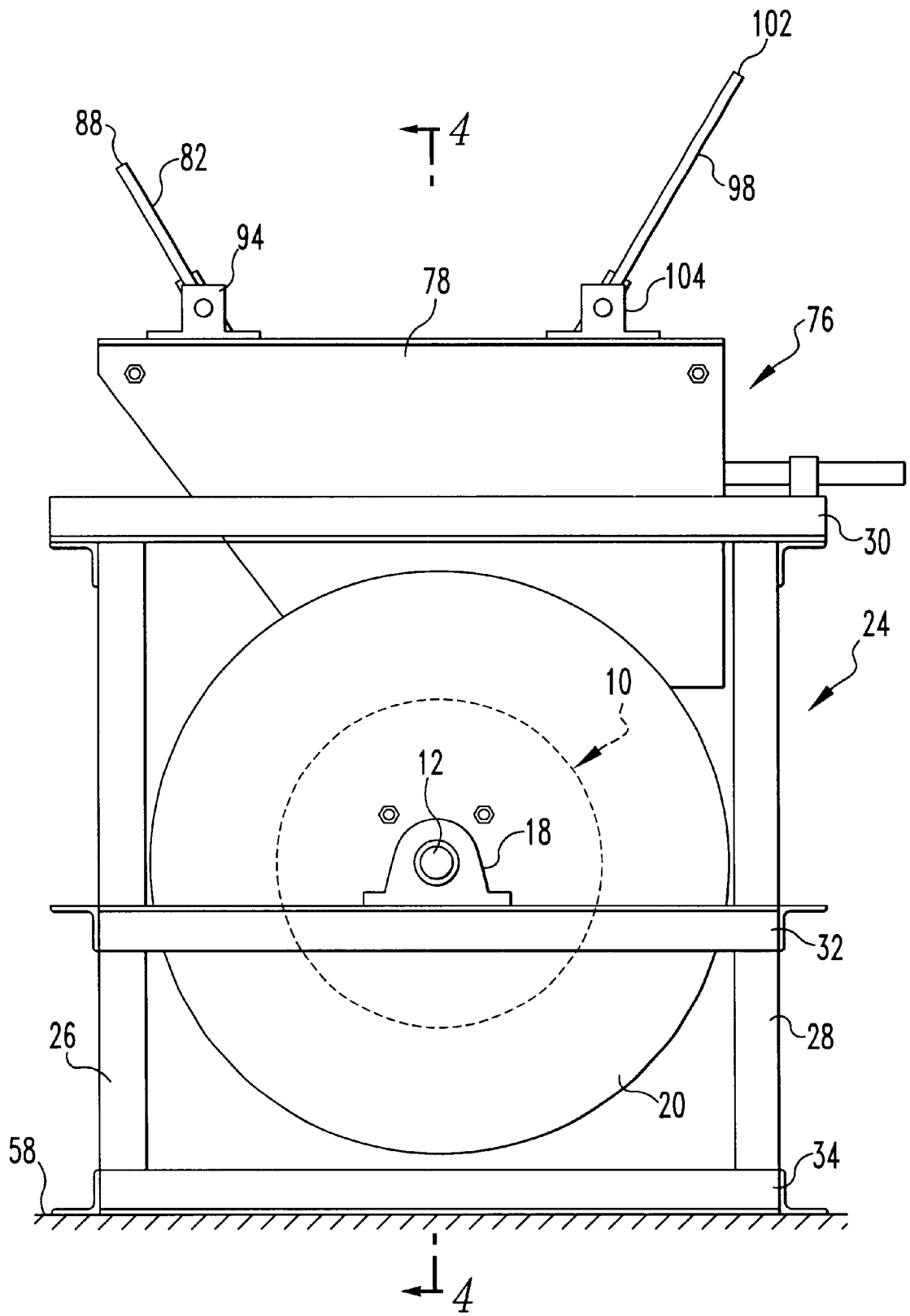
FIG. 1 is a side elevational view of an apparatus representing a preferred embodiment of the particulate material feeding and metering apparatus of the present invention.
Figure 2:
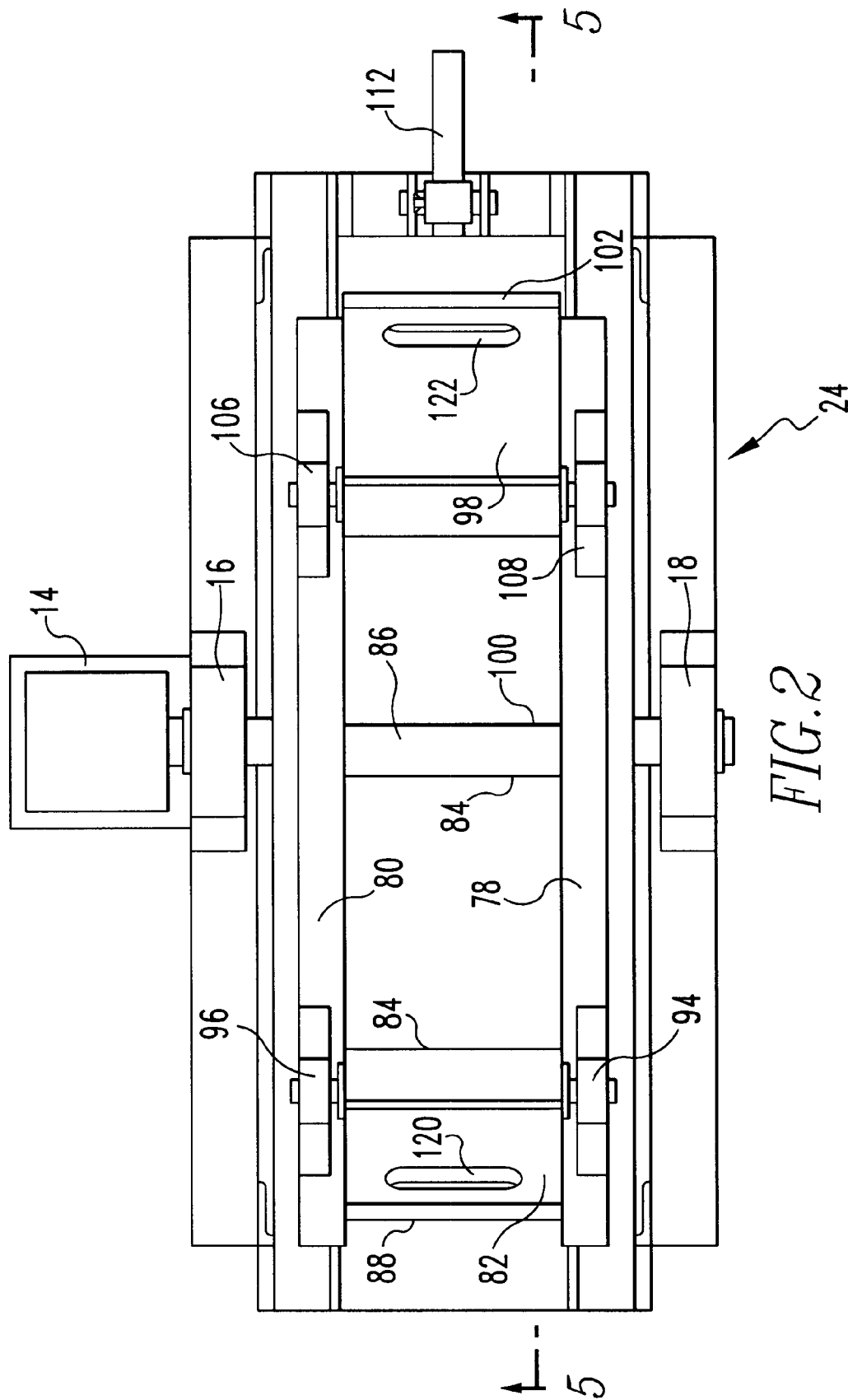
FIG. 2 is a top plan view of the apparatus shown in FIG. 1.
Figure 3:
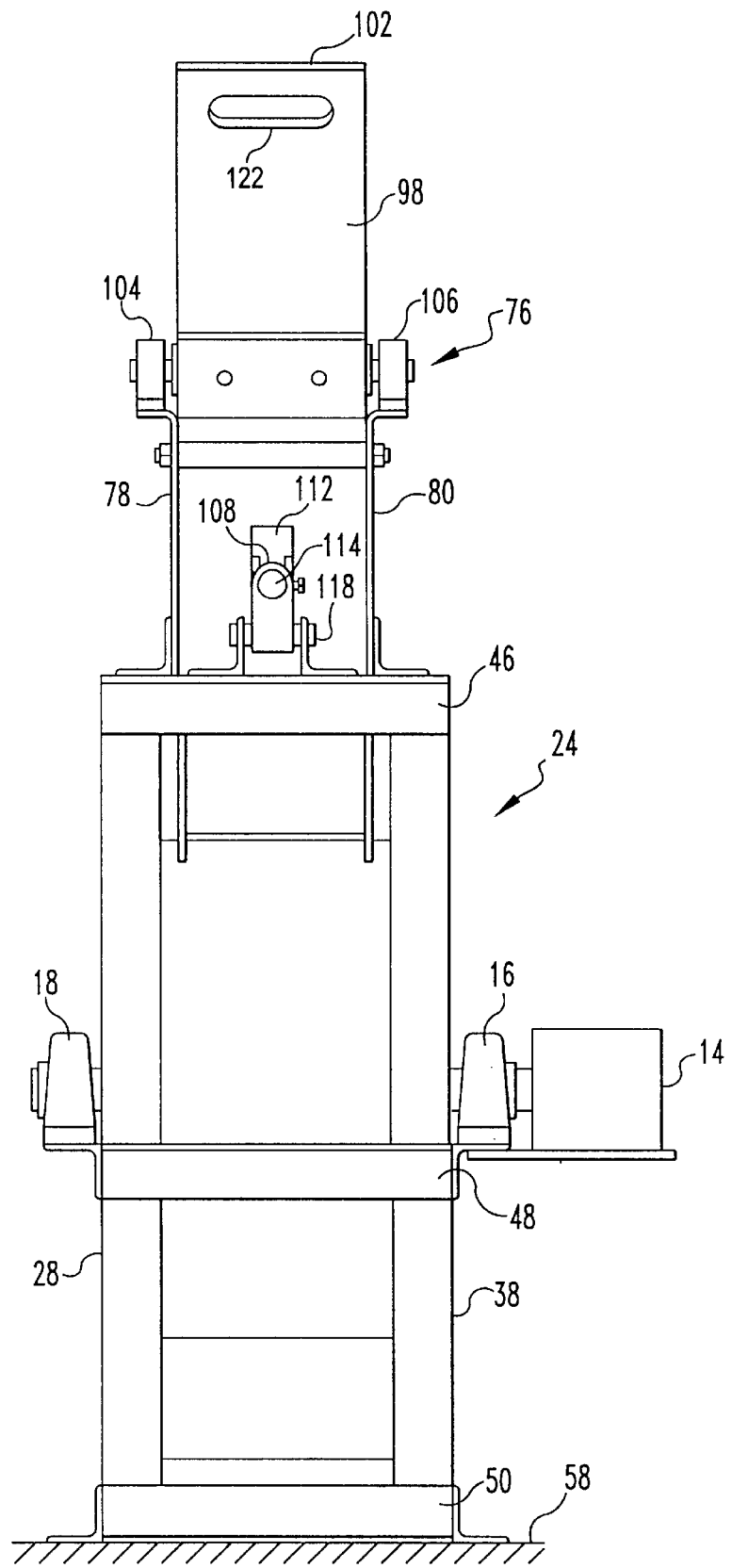
FIG. 3 is a front elevational view of the apparatus shown in FIG. 1.

Referring to FIGS. 1–5, the apparatus of the present invention includes a drum 10. Preferably, this drum is cylindrical, but it will be understood that it may also be cross as sectionally sextagonal or octagonal or any other operable shape. This drum has an axle 12 which is caused to rotate by electric motor 14 on bearings 16 and 18. The direction of this axle 12 will be referred to herein as the "longitudinal axis" of the drum. Adjacent the drum 10 there are lateral disc shaped walls 20 and 22 which are vertical and in parallel spaced relation to each other. The drum 10 is mounted on a frame shown generally at numeral 24. On the outer side of frame 24 there are vertical members 26 and 28 and horizontal members 30, 32, and 34. On the inner side of frame 24 there are vertical members 36 and 38 and horizontal members 40, 42, and 44. The frame 24 also includes front transverse members 46, 48, and 50. Similarly, there are rear transverse members 52, 54, and 56. The entire frame is mounted on a floor 58.

Figure 4:
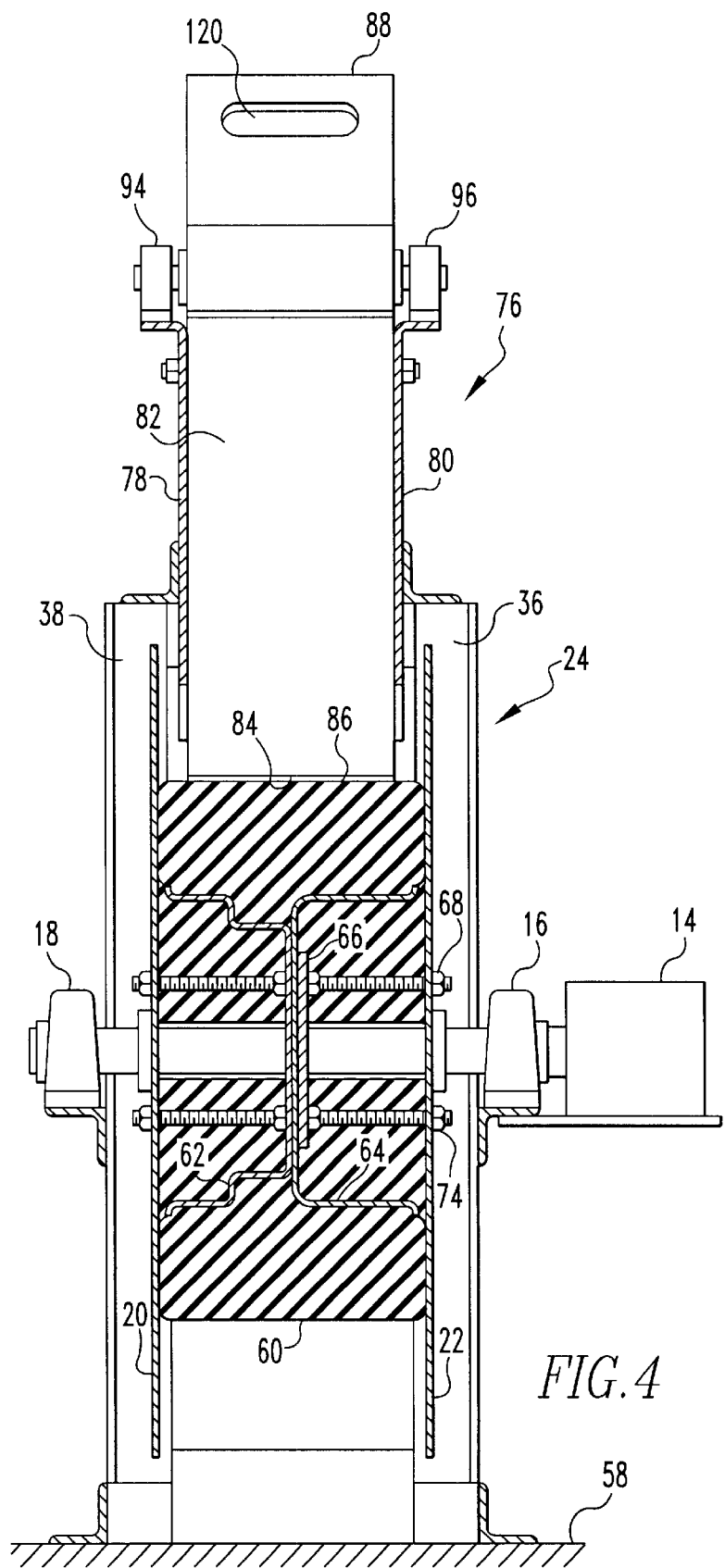
FIG. 4 is a cross sectional view through 4—4 in FIG. 1.
Figure 5:
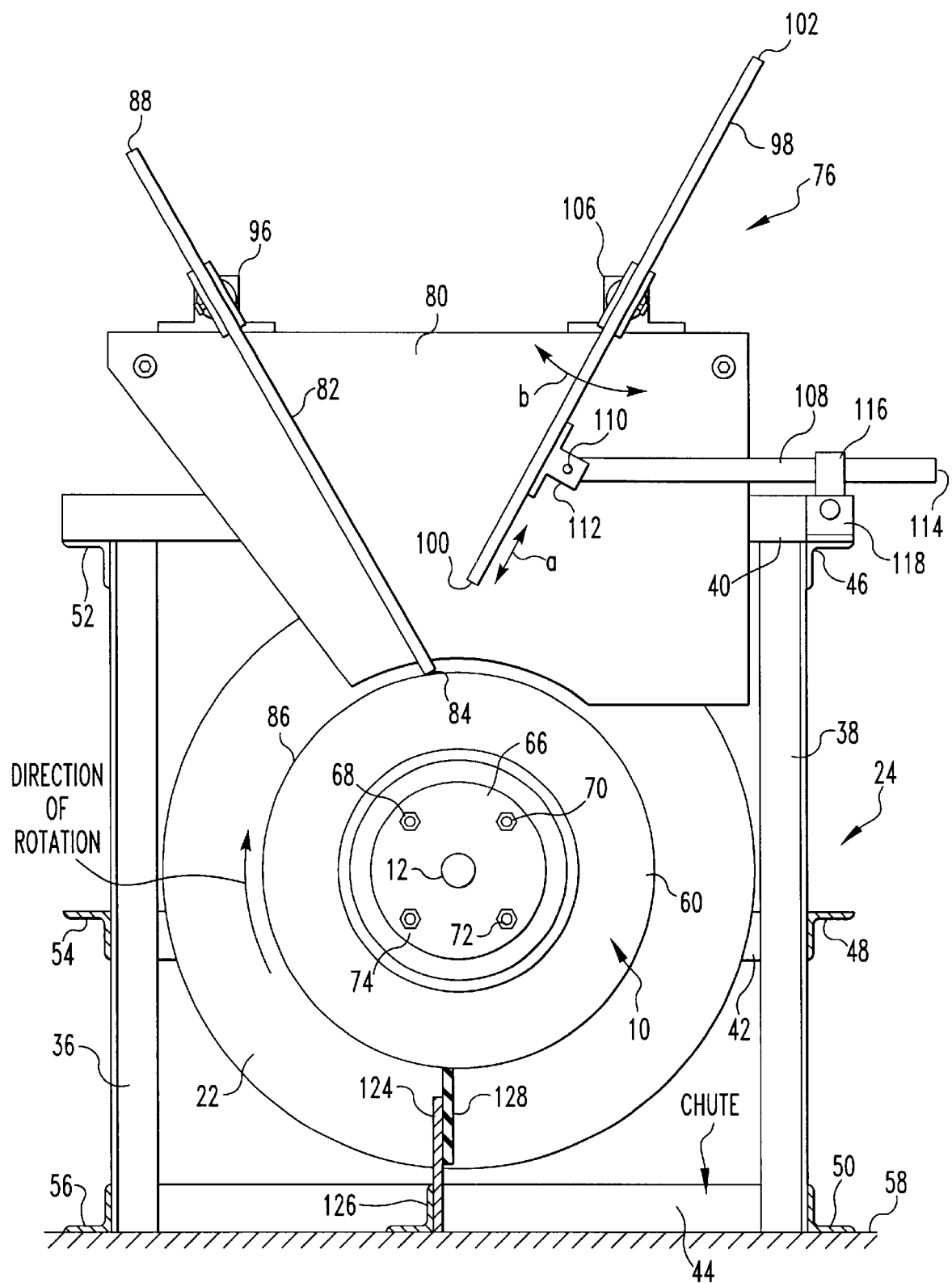
FIG. 5 is a cross sectional view through 5—5 in FIG. 2.

Referring particularly to FIGS. 4 and 5, the drum 10 includes a rubber member 60 which is supported by a metal inner concave support 62 and another opposed metal inner concave support 64. An annular plate 66 is superimposed over the inner concave support 64. The above elements of the drum 10 as well as disc shaped walls 20 and 22 are retained together by means of bolt and nut combinations 68, 70, 72, and 74. It will be understood that there are appropriate apertures (not shown) in the disc shaped walls 20 and 22 and concave supports 62 and 64 to allow axle 12 to pass therethrough. Annular plate 66 is fixed to axle 12 and extends radially therefrom to allow drum 10 to be rotated with axle 12.

Referring to the drawings generally, and in particular to FIG. 5, the hopper element is shown generally in 76. This hopper 76 includes parallel spaced lateral plates 78 and 80. The hopper 76 also includes a rear oblique plate 82 which has an inner edge 84 which bears against peripheral surface 86 of annular rubber member 60 of the drum 10. From inner edge 84 rear oblique plate 82 extends outwardly to outer edge 88. On lateral plates 78 and 80 which have selectively lockable retaining mechanisms 94 and 96 which may be unlocked to allow the rear oblique plate 82 to be removed, although it will be understood that during the general operation of this apparatus the rear oblique plate 82 may remain stationary although as is indicated below may be moveable or vibrateable. The hopper 76 also includes a moveable front oblique plate 98 which has an inner end 100 which will ordinarily either abut or be adjacent to the outer peripheral edge 86 of the annular rubber member 60 of the drum 10. The moveable front oblique plate 98 extends outwardly from inner edge 100 to outer edge 102, and immediately between the inner and outer edges it is retained by selectively lockable retaining mechanisms 104 and 106. The selectively lockable retaining mechanisms 104 and 106 may be loosened to allow movement of inner edge 84 of the moveable front oblique plate 98 either toward or away from the peripheral surface 86 of the annular rubber member 60 of the drum 10 in the directions of arrows a. Movement of the front oblique plate 98 is also controlled by a forwardly extending arm 108 which is pivotally connected to the front oblique plate 98 at pivot point 110 on bracket 112. Adjacent its opposed forward end 114 from where the arm is manipulated the forwardly extending arm 108 passes through a front arm guide 116 which is mounted on a front arm support 118. Forwardly extending arm 112 may be used to pivot front oblique plate 98 on the retaining mechanisms 104 and 106 generally in the directions of arrows b. The rear oblique plate 82 has an outer aperture 120 (FIGS. 2 and 4) which may be used in its manipulation. The front oblique plate 98 also has an upper plate aperture 122 (FIGS. 2 and 3) which may also be used to facilitate its manipulation. Referring again particularly to FIG. 5, it will seen that plate 124 extends upwardly from support 126 to hold rubber scraper 128 against peripheral surface 86 of the annular rubber member 60. As will be described hereafter, this scraper 128 serves to remove particulate material which may stick to the peripheral surface 86. The drum 10 is rotated on axle 12 by electric motor 14, and particulate material is discharged by gravity to a chute (not shown).

Figure 6:
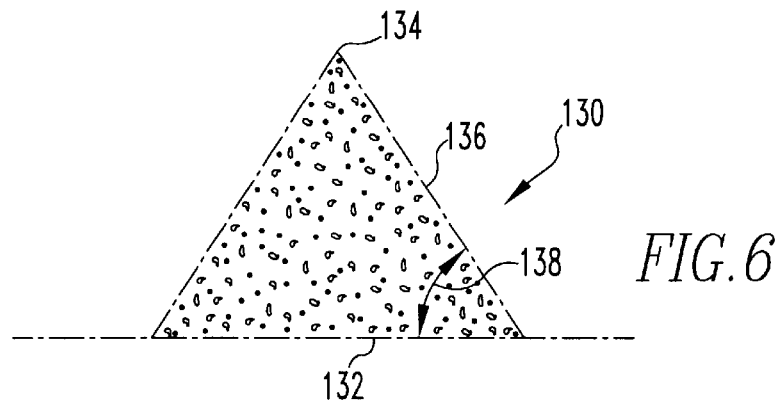
FIG. 6 is a schematic view of a first particulate material which may be metered and fed in the apparatus of the present invention.

Referring to FIG. 6, a heap or quantity of particulate material is shown generally at numeral 130. The particulate material is in a generally conical shape and has a horizontal base 132, an apex 134 and a sloped side 136 between the apex 134 and the base 132. The angle of repose 138 is the angle between the sloped side 136 and the base 132, and this angle of repose 138 is the largest angle between the base 132 and the sloped side 136 at which the particular particulate material 130 will remain stable and not slide downwardly from sloped surface 136. It will be understood that the angle of repose 138 is characteristic of the particulate material 130 and will generally vary from one type of particulate material to another.

Figure 7:
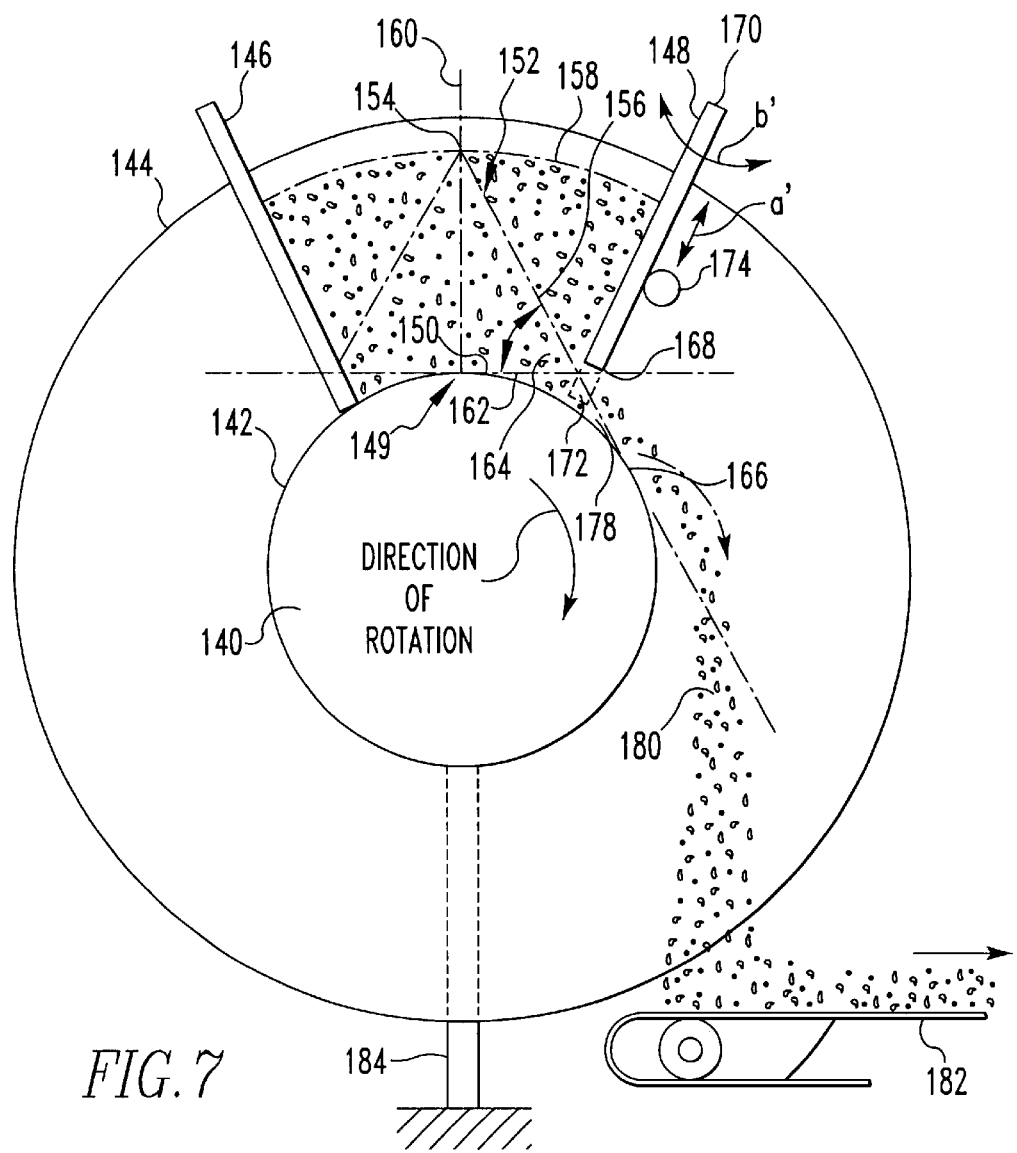
FIG. 7 is a cross sectional schematic view of an apparatus similar to FIG. 1 in which a particulate material shown in FIG. 6 is being metered and fed.

Referring to FIG. 7, another preferred embodiment of the apparatus is shown schematically to illustrate the manner in which particulate material as is shown in FIG. 6 is feed and metered in the apparatus of the present invention. This embodiment is similar in material respects to the embodiment shown in FIGS. 1–5, in which there is a rotating drum 140 which has a peripheral surface 142. There are also opposed disc shaped walls as at wall 144, and there is a hopper which includes a rear oblique plate 146 and a moveable front oblique plate 148. Between the stationary rear oblique plate 146 and the moveable front oblique plate 148 there is, on the peripheral surface 142 on the upper side 149 of the drum 140, a particulate receiving surface 150. On this particulate receiving surface 150 there is a particulate material which is initially in the shape of generally conical shape 152 which, similar to the material in FIG. 6, has an apex 154 and a sloped side 156, the slope of which will vary depending on the angle of repose of the particular particulate material being metered and fed. After this generally conically shaped particulate material is emplaced on the particulate material receiving surface 150, additional particulate material 158 is stacked between the sloped side 156 of the conically shaped particulate material 152 and the rear oblique plate 146. The conically sloped particulate material has a vertical centerline 160 which bisects the angle of the apex 154. There is a tangent 162 which is perpendicular to the vertical centerline 160. The angle of repose 164 of the particulate material is formed between tangent 162 and sloped side 156. The sloped side 156 extends to be tangent to the peripheral surface 142 of drum 140 at point 166. The moveable front oblique plate 148 has an inner edge 168 and an outer edge 170. The moveable front oblique plate 148 is moved outwardly from the peripheral surface 142 of drum 140 so that the inner edge 168 is positioned on or just outside of a line of sloped side 156. In other words, the moveable front plate 148 is opened by a sufficient distance 172 so that the angle of repose 164 is accommodated and particulate material continuously flows therethrough. Similar to the way shown in FIG. 5, front plate 148, may be moved in or out as at arrows a' and can also be moved angularly as is shown in arrows b'. A structural support 174 may be positioned adjacent the moveable front oblique plate 148. There is a slumping portion 178 of the particulate material 152 between the inner edge 168 of the moveable front oblique plate 148 on the tangent point 176 of the line of the sloping side 156 of the conically shaped particulate material 152. Beneath this slumping portion 178 there is a stream 180 of particulate material which is caught on a continuous belt conveyor 182. Any particulate material remaining on the peripheral surface 142 of the drum 140 may be removed by means of a stationary scraper 184.

When the drum 140 and disks are rotated in the clockwise direction, friction between the drum 140 and the particulate material causes the particulate material to flow through the gap between the front oblique plate 148, and the peripheral surface 142 of the drum 140 at a measured rate that depends upon the drum's rotational velocity. When the drum 140 stops rotating, the flow of material between the front oblique plate 148 and the drum 140 ceases inasmuch as the particulate material reestablishes the slumping portion 178 that is limited by the front oblique plate 148. While the direction of rotation of the drum is shown as being in the clock wise direction, it will be understood that it may be advantageous under some circumstances to allow the drum to reversible in direction and to allow the oblique plate 146 to be displaced from the peripheral surface of the drum.

The flow rate of the particulate material between the front oblique plate 148 and the drum 140 can be increased by increasing the rotational velocity of the drum 140. Additionally, the particulate material that flows between the front oblique plate 148 and the drum is evenly metered and thus can be deposited onto a belt conveyor 182. The front oblique plate 148 can be adjusted both angularly and translationally to accommodate different materials having different angles of repose. The rear oblique plate 146 is also adjustable both angularly and translationally to form an optimum seal at its inner edge with the drum. The rear oblique plate 146 may also vibrate to prevent material from sticking thereto.

Still referring to FIG. 7, an alternate analysis of the method of the invention would include a center point of the surface of the particulate material which would coincide with the apex 154 of the conical shape 152. The sloped line 156 extends from center point 154 to tangent point 176. The inner edge of plate 148 is positioned approximately on sloped line 156, and the drum 140 is rotated about its longitudinal axis to allow the particulate material to be accurately fed and metered.

Figure 8:
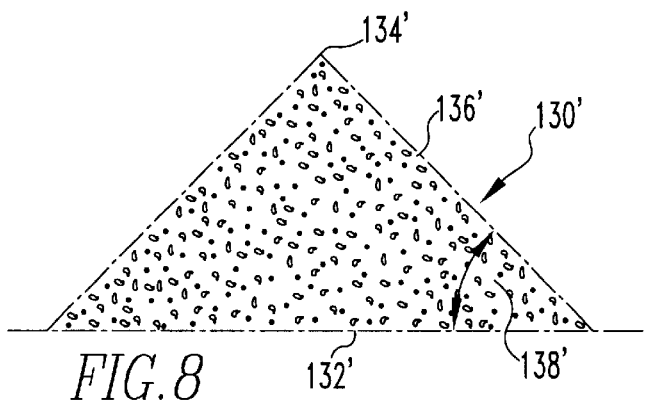
FIG. 8 is a schematic view of a different second particulate material which may be metered and fed in the apparatus of the present invention which has a smaller angle of repose than the particulate material shown in FIG. 6.
Figure 10:
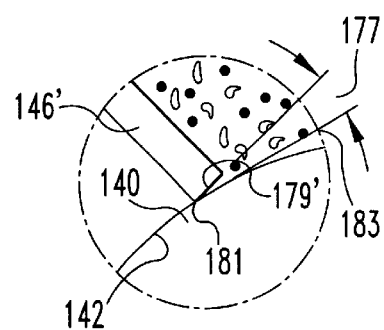
FIG. 10 is an enlarged view of circle 10 in FIG. 9.
Figure 9:
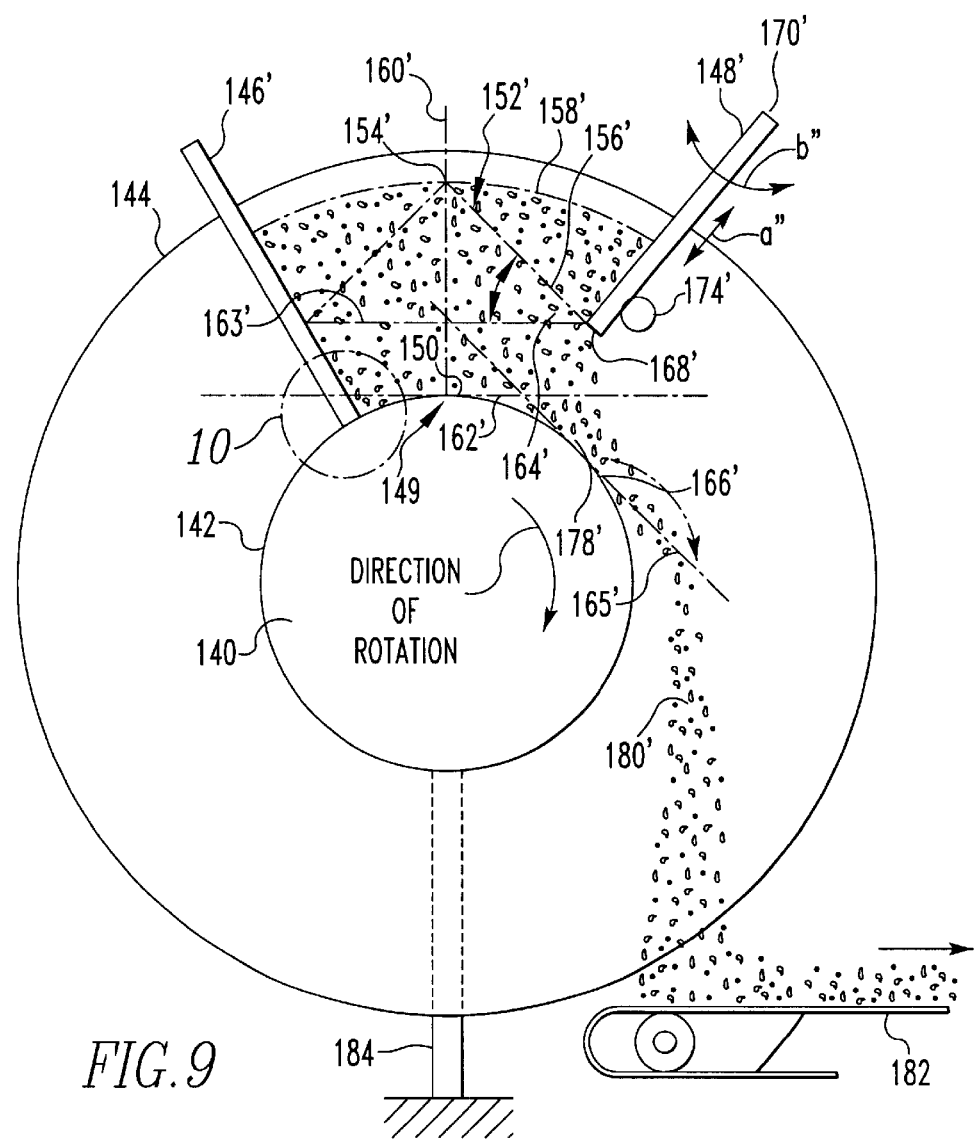
FIG. 9 is a cross sectional schematic view of an apparatus similar to FIGS. 1 and 7 in which a particulate material shown in FIG. 8 is being metered and fed.

Referring to FIGS. 8–10, the apparatus is shown with a conically shaped body of a particulate material 1310 which has characteristics which are different from the particulate material shown in FIGS. 6–7. This conically shaped body has a base 132', an apex 134', a sloped side 136' and an angle of repose 138' which is smaller than the angle of repose 138 of material 130 shown in FIGS. 6–7. Similar to FIGS. 6–7, the drum 140 has a peripheral surface and a disc shaped wall 144. The rear plate 146' and a front plate 148' which are positioned differently, respectively, from the rear plate 146 and front plate 148 shown in FIGS. 6–7 due to the differences in the angles of repose 138 and 138' of materials 130 and 130' respectively.

Referring particularly to FIG. 10, the rear plate 146' is positioned in a way so that its inner edge abuts the peripheral surface 142 of the drum at its rear side and so that its front side is canted from the peripheral surface 142 so that an angle 177 is formed which is approximately equal to the angle of repose 134' so as to improve the seal between the rear plate 146 and the peripheral surface 142 of the drum 140. The rear plate 146' has an inner edge 179 and abuts peripheral surface 142 at outer corner 181. Line 183 is tangent to peripheral surface 142 at the point where corner 181 abuts the peripheral surface 142. Angle 177 between edge 179 and tangent line 183 is approximately equal for the angle of repose 138' in FIG. 8.

In FIG. 9, similar to FIG. 7, between the stationary rear oblique plate 146' and the moveable front oblique plate 148', there is on the peripheral surface 142 on the upper side 149 of the drum 140, a particulate receiving surface 150. On this particulate receiving surface 150 the particulate material in the generally conical shape 152' has an apex 154' and a sloped side 156', the slope of which will vary depending on the angle of repose of the particular particulate material being metered and fed. After this generally conically shaped particulate material is emplaced on the particulate material receiving surface, additional particular material 158' is stacked between the sloped side 156' of the conically shaped particulate material 152' and the rear oblique plate 146'. The conically sloped particulate material has a vertical centerline 160 which bisects the angle of the apex 154'. There is a tangent 162' which is perpendicular to the vertical centerline 160'. Line 163' is parallel to the tangent 162' and intersects sloped side 156'. The angle of repose 164' of the particulate material is formed between line 163' and sloped side 156'. Line 165' which is parallel to the sloped side 156' extends to be tangent to the peripheral surface 142 of drum 140 at point 166'. The moveable front oblique plate 148' has an inner edge 168' and an outer edge 170'. Similar to the way shown in FIG. 5, front plate 148' may be moved in or out as at arrows a' and can also be moved angularly as is shown in arrows b'. The moveable front oblique plate 148' is moved outwardly from the peripheral surface 142 of drum 140 so that the inner edge 168' is positioned on or just outside of a line of sloped side 156. In other words, the moveable front plate 148' is opened by a sufficient distance 172' so that the angle of repose 164' is accommodated and particulate material continuously flows therethrough. A structural support 174 may be positioned adjacent the moveable front oblique plate 148'. There is a slumping portion 178' of the particulate material 152' between the inner edge 168' of the moveable front oblique plate 148' on the tangent point 166' of the line of the sloping side 156' of the conically shaped particulate material 152'. Beneath this slumping portion 148' there is a stream 180' of particulate material which is caught on a continuous belt conveyor 182. Any particulate material remaining on the peripheral surface 142 of the drum 140 may be removed by means of the stationary scraper 184.

When the drum 140 and disks are rotated in the clockwise direction, friction between the drum 140 and the particulate material causes the particulate material to flow through the gap between the front-oblique plate 148', and the peripheral surface 142 of the drum 140 at a measured rate that depends upon the drum's rotational velocity. When the drum 140 stops rotating, the flow of material between the front oblique plate 148' and the drum 140 ceases inasmuch as the particulate material reestablishes the slumping portion 178' that is limited by the front oblique plate 148'.

In FIG. 9, as with the FIG. 7 example, the flow rate of the particulate material between the front oblique plate 148' and the drum 140 can be increased by increasing the rotational velocity of the drum 140. Additionally, the particulate material that flows between the front oblique plate 148' and the drum is evenly metered and thus can be deposited onto the belt conveyor 182. The front oblique plate 148' can be adjusted both angularly and translationally to accommodate different materials having different static angles of repose. The rear oblique plate 146' is adjustable both angularly and translationally to form an optimum seal at its inner edge with the drum. The rear oblique plate may also vibrate to prevent material from sticking thereto.

In FIG. 9, an alternate analysis of the method of the invention would include a center point of the surface of the particulate material which would coincide with the apex 154' of the conical shape 152'. Line 165' is parallel to sloped line 156' extends to tangent point 166'. The inner edge of plate 148' is positioned approximately on sloped line 156', and the drum 140 is rotated about its longitudinal axis to allow the particulate material to be accurately fed and metered.

Figure 11:
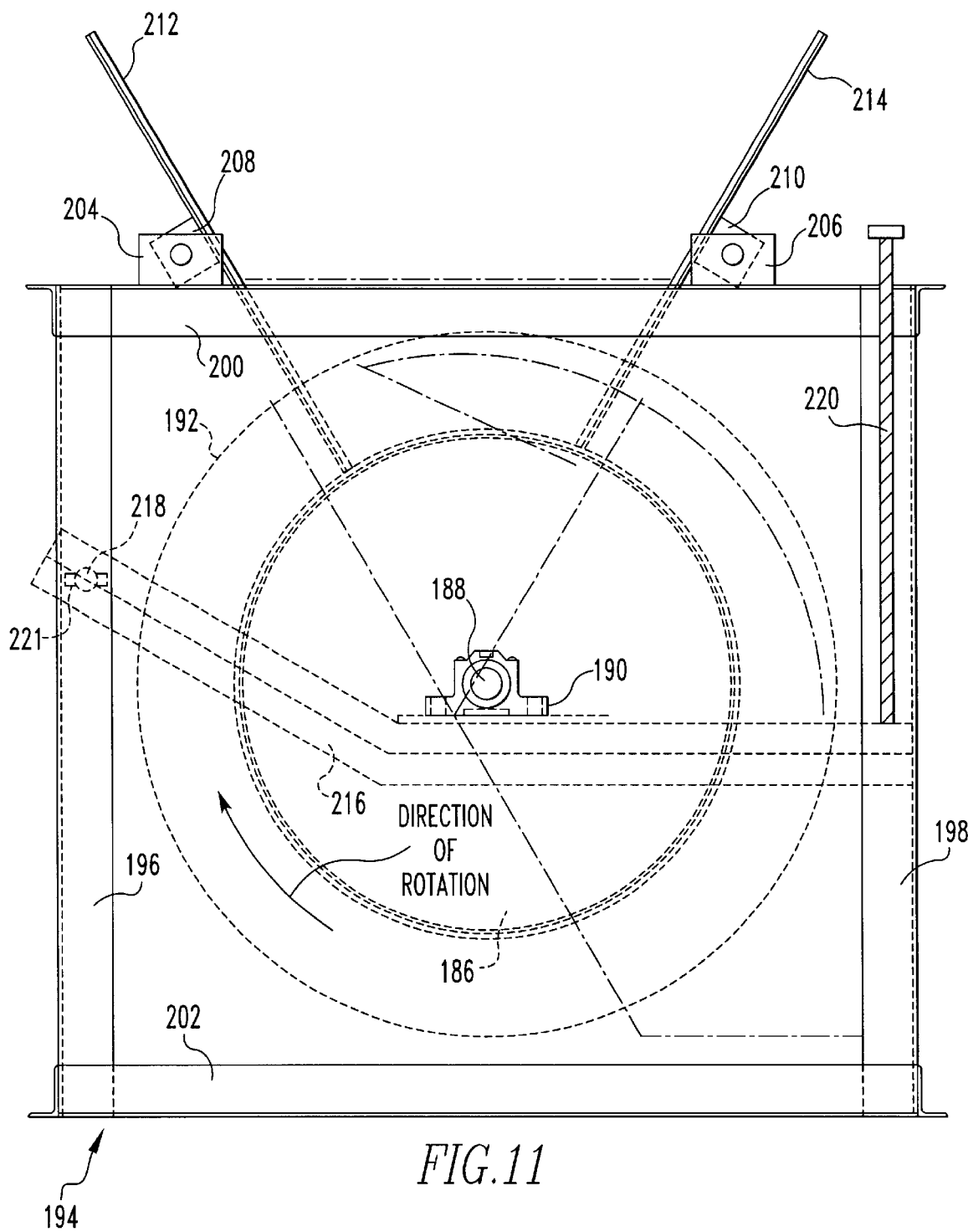
FIG. 11 is a side elevational view of an apparatus representing a second preferred embodiment of the particulate material feeding and metering apparatus of the present invention.

Referring to FIG. 11 another embodiment is shown in which there is a drum 186 which rotates on an axil 188 on opposed bearings as at bearing 190. Similar to the embodiment described above there are a pair of disc shaped walls as at wall 192. Also similar to the first embodiment there is a frame which is shown generally at numeral 194 which includes vertical members 196 and 198 and horizontal members 200 and 202. On horizontal member 200 there are plate supports 204 and 206 on which there are selectively lockable retaining means 208 and 210 respectively. These retaining means hold respectively rear oblique plate 212 and a front oblique plate 214. As was described above the front oblique plate 214 is positioned toward the direction of rotation of the drum 186 and is moveable away from and toward the peripheral surface of the drum 186 to be set to correspond with particular angle or repose of the material being metered and fed. The opposed bearings as at bearing 190 is mounted on a moveable bearing support bar 216. On one end moveable support bar 216 is pivotally mounted on vertical element 196 of the frame 194 at pivot point 218 at its opposed end the moveable support bar 216 is moved upwardly or downwardly by a displacement screw 220 which is fixed to the horizontal member 200 of the frame 194. It would also be possible to fix position point 218 on an oblong slot 221, so that its position can be laterally adjusted. It will be understood that at its opposed side the other bearing (not shown) is similarly mounted on another moveable support bar (not shown). By means of the above described arrangement, it will be appreciated by those in the art that the tangent line as was described in FIG. 7 may be adjusted by moving the bearings as at bearing 190 upwardly or downwardly on the moveable support bar as at bar 216.

Figure 12:
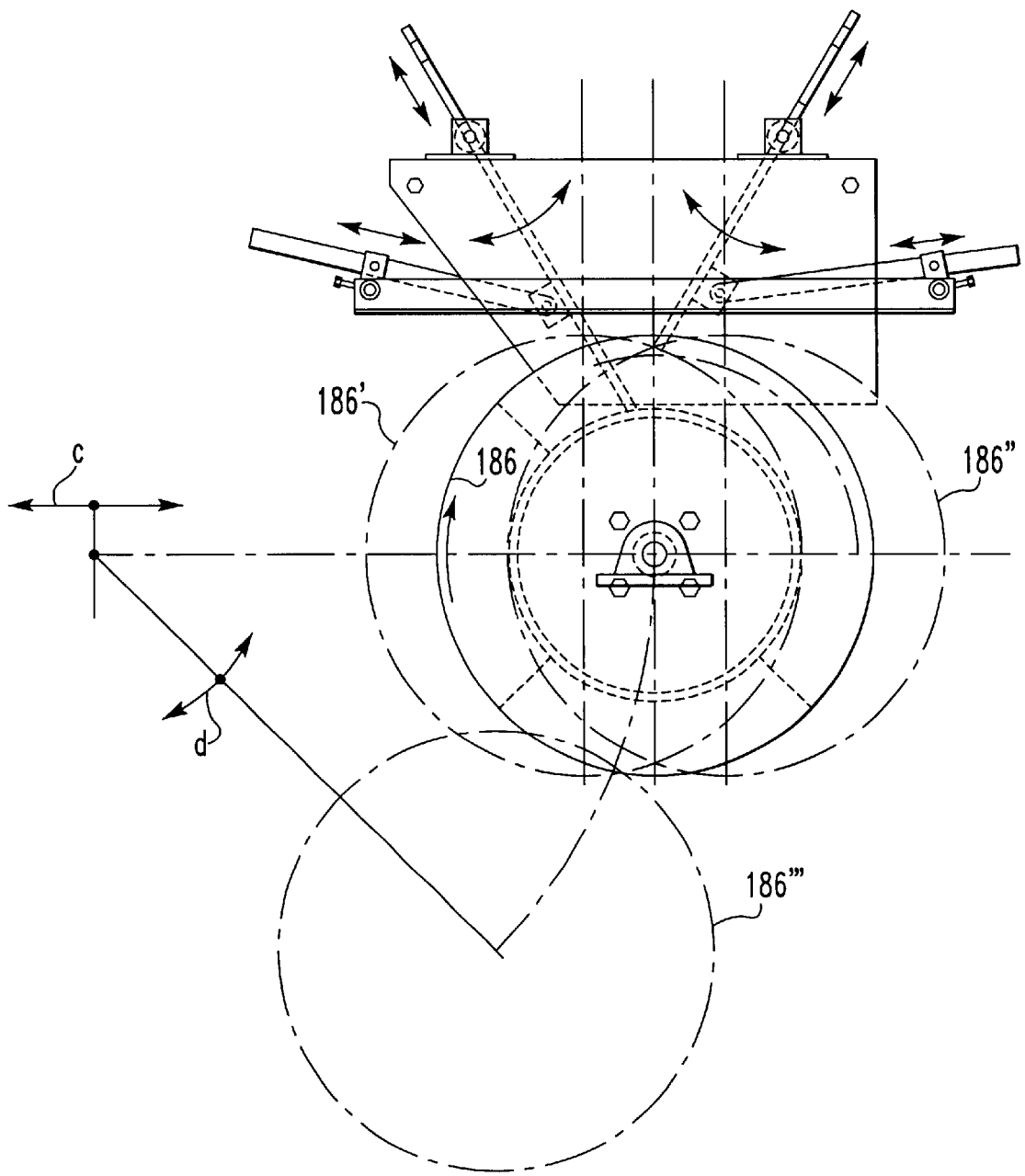
FIG. 12 is a schematic side elevational view of the apparatus shown in FIG. 11 in which the adjustment of the apparatus by movement of the support bar is illustrated.

Referring to FIG. 12 the ways of adjusting the position of the drum 186, is discussed concerning FIG. 11, are further illustrated. By moving the pivot point 218 laterally inwardly or outwardly in the direction of arrows c, the drum 186 may be moved, for example, to the positions 186' and 186" respectively. By moving the drum angularly upwardly or downwardly in the directions of arrows d, the drum 186 may be moved, for example, to position 186'".

Figure 13:
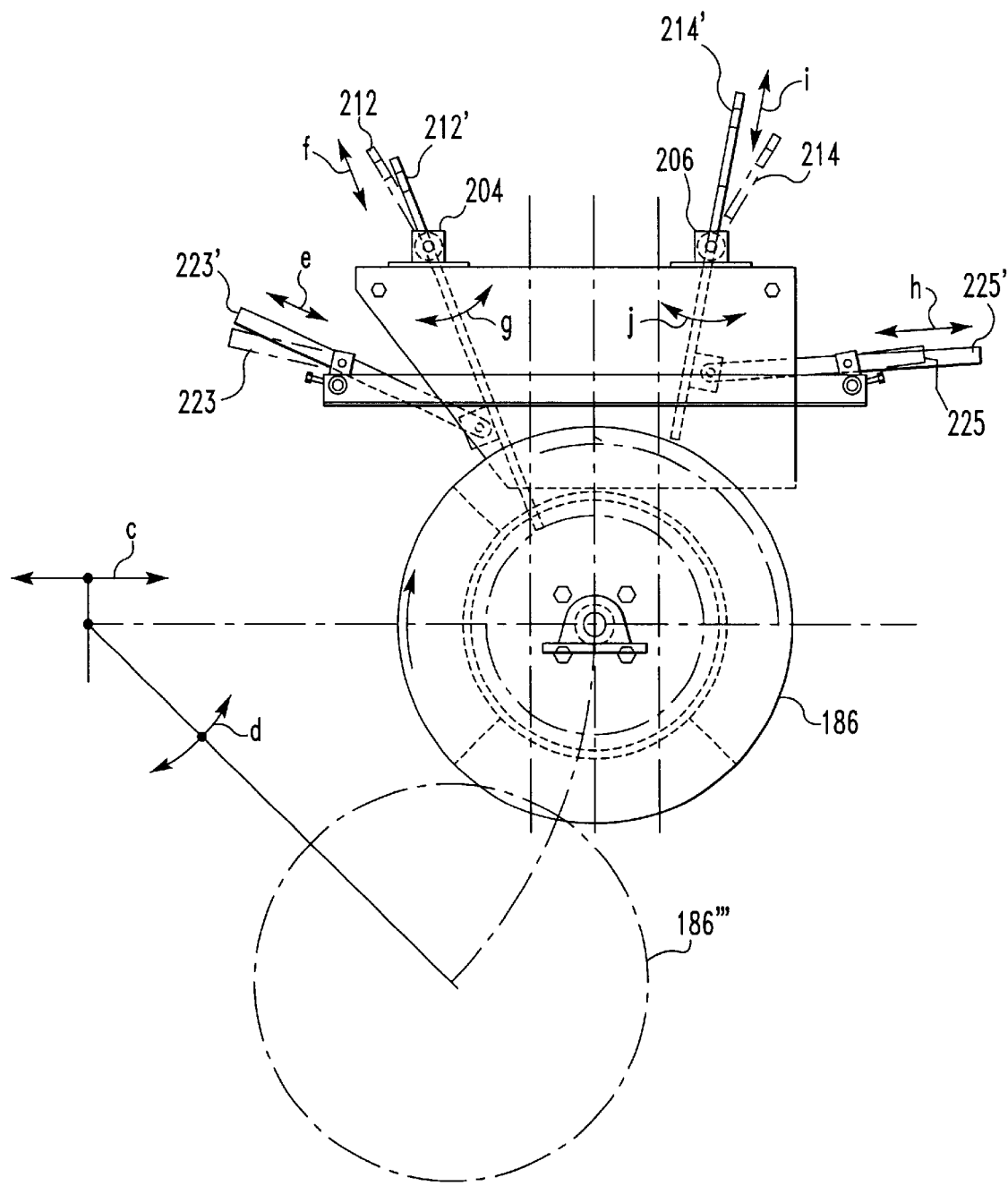
FIG. 13 is a schematic side elevational view similar to FIG. 12 in which the adjustment of the apparatus by the additional movement of the front and rear oblique plates is illustrated.

Referring to FIG. 13, the ways of adjusting the position of the rear oblique plate 214 and the front oblique plate 216 are further illustrated. In this embodiment, the rear oblique plate 212 has a rearwardly extending arm 223 which is similar to forwardly extending arm 108 described above. This rearwardly extending arm is capable of rear and forward motion in the directions of arrows e. The rear oblique plate 212 is capable of outward and inward motion in the direction of arrows f and of angular motion on support 204 in the directions of arrow g. Such motion is capable, for example, of moving the rearwardly extending arm 223 and the rear oblique plate 212 respectively to positions 223' and 212'. In this embodiment the front oblique plate 214 also has a forwardly extending arm 225 which is similar to the forwardly extending arm 108 described above. This forwardly extending arm is capable of rear and forward motion in the directions of arrows h. The front oblique plate 214 is capable of rear and forward motion in the directions of arrows i and of angular motion on support 206 in the directions of arrows j. Such motion is capable, for example, of moving the forwardly extending arm 225 and the front oblique plate 214 respectively to positions 225' and 214'.

Figure 14:
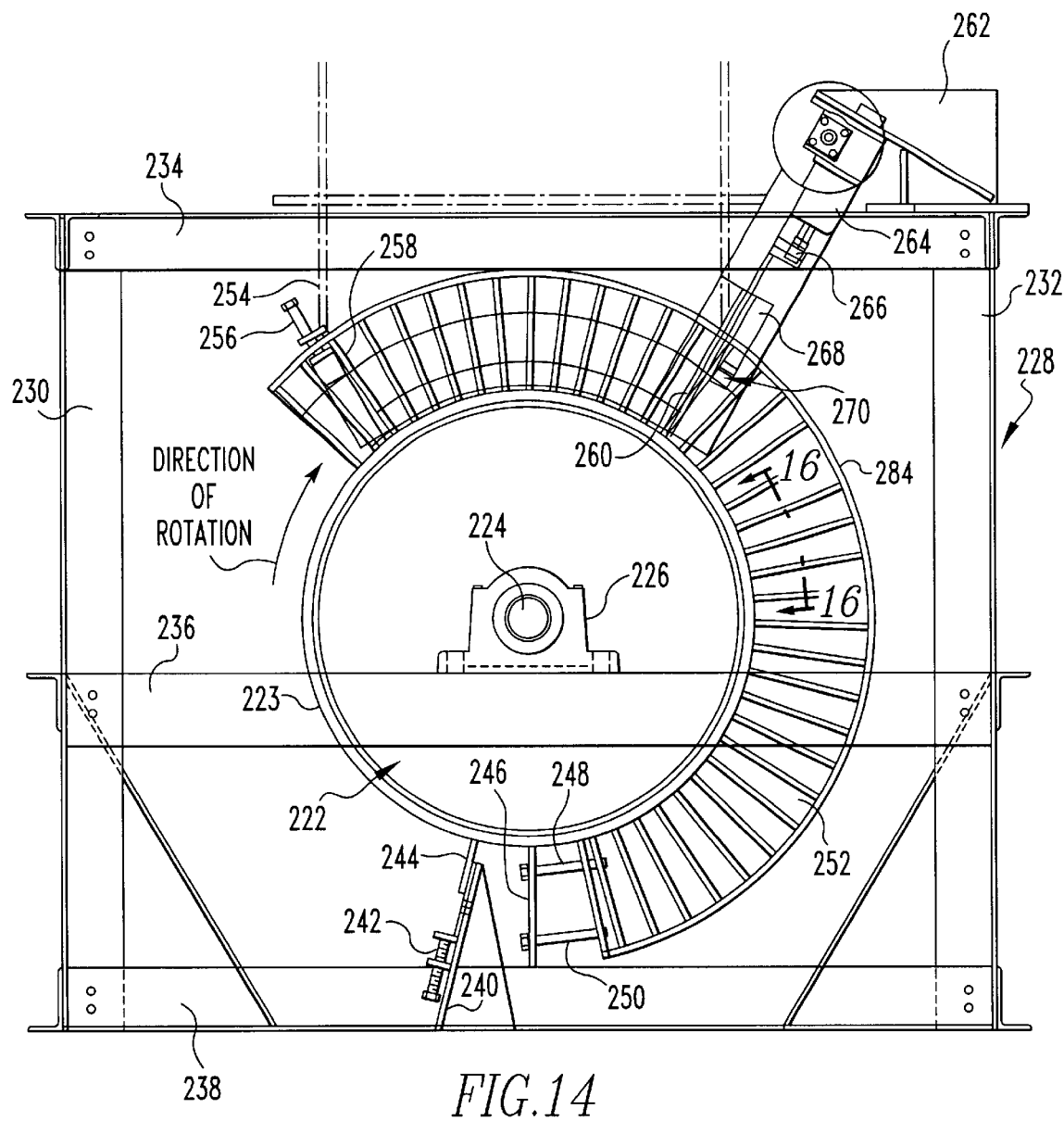
FIG. 14 is a side elevational view of an apparatus representing a third preferred embodiment of the particulate material feeding and metering apparatus of the present invention.
Figure 15:
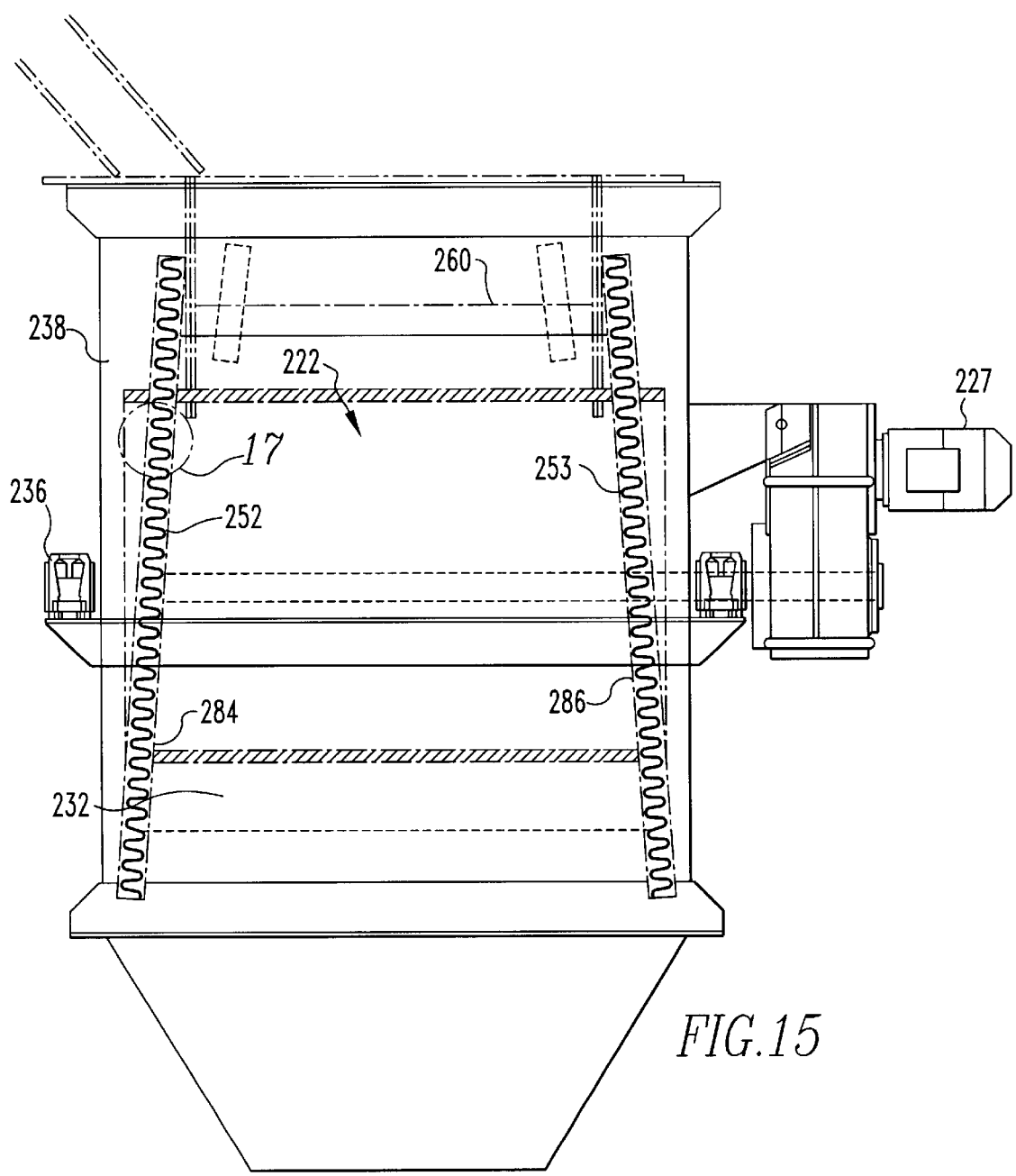
FIG. 15 is a front end view of the apparatus shown in FIG. 14 (without the front plate manipulating piston and cylinder combination)

Referring to FIGS. 14 and 15 another preferred embodiment is shown in which there is a drum 222 which rotates on an axle 224 on a bearings as at bearing 226 and driven by electric motor 227. There is a frame shown generally at numeral 228 which has vertical members as in members 230 and 232 and longitudinal members as in members 234, 236, and 238. Extending from horizontal member 238 of the frame 228 there is a frame appendage 240 on which there is an adjustment bolt 242 for adjusting a scrapper 244. Also extending from horizontal member 238 there is a frame appendage 246 from which bolts 248 and 250 secure a cross-sectionally sinusoidal shaped rubberwall 252. The inner edge of this rubber wall 252 abuts or is closely spaced from the peripheral surface 223 of the drum 222. On the opposed side of the drum 222 there is another similar sinusoidal rubber wall 253, and a combination of these two walls 252 and 253 serve to keep particulate matter being metered and fed on the outer peripheral surface of the drum 222 in the way described with the first embodiment. A suitable material for fabricating the sinusoidal rubber walls 252 and 253 is commercially available from Apache Hose and Belting of Cedar Rapids, Iowa. It will also be understood that the walls 252 and 253 maybe comprised of any resilient material and do not necessarily have to be cross-sectionally sinusoidal but may be any curved shaped which is preferably regularly repeating. It will be understood that the sinusoidal rubber walls 252 and 253 are stationary relative to the drum 222, that is they do not rotate. Further the sinusoidal rubber walls 252 and 253 form an efficient seal with the rotating drum 222. There is also another frame appendage 254 to which the sinusoidal rubber wall 252 is secured by means of a bolt 256. It will be appreciated that the cross,sectionally sinusoidal shape of wall 252 allows the wall 252 to be easily stretched from appendage 246 to frame appendage 254. The wall 252 may, therefore, be efficiently positioned adjacent to the drum 222, usually without requiring it to be cut or otherwise especially shaped to be positioned in this way. Also extending from the frame appendage 254 there is a rear stationary oblique wall 258 which serves in a way described in connection with the first embodiment to contain particulate matter on the peripheral surface 223 of the drum 222. Similarly there is a front moveable oblique wall 260 which also serves to maintain particulate matter on the peripheral surface of the drum 222. There is also an upper support 262 a piston and cylinder combination 264 extends from the upper support 262 and is pivotally mounted to the front moveable oblique wall 260 at pivot point 266. There is another piston and cylinder combination 268 which is pivotally connected to front moveable oblique wall 260 at 270. By cooperative action of the piston and cylinder combinations 264 and 268 the front moveable wall 260 may be selectively moved away from or toward the peripheral surface of the drum 222 to allow the space between that wall and the drum to be adjusted to conform to the stationary angle of repose of the material being metered and fed.

Figure 16:
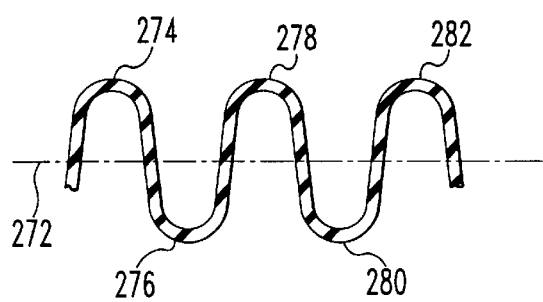
FIG. 16 is a cross section through 16—16 in FIG. 14.
Figure 17:
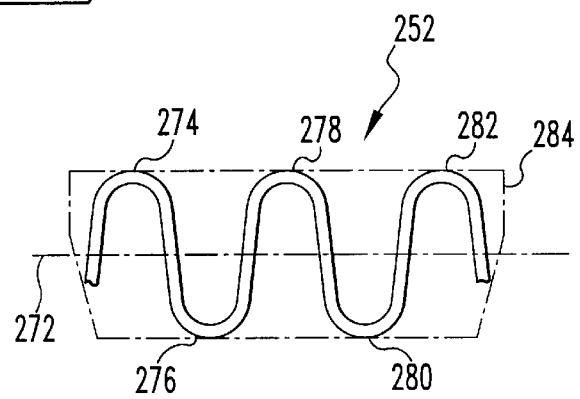
FIG. 17 is a detailed view of circle 17 in FIG. 15.

Referring to FIGS. 14–17 and particularly to FIG. 16, the cross sectional repeating curved pattern of the wall 252 is shown in greater detail. The wall 252 has a generally vertical centerline 272, an forward curve 274, which is followed by a reverse curve 276 which is followed by a forward curve 278 which is followed by another reverse curve 280 which is followed by still another forward curve 282. This pattern is substantially uniform over the heights of the walls 252 and 253. Referring particularly to FIG. 17, there is shown a generally vertical centerline 272 with the sequential forward curves and reverse curves as at forward curves 274, 278 and 282 and reverse curves 276 and 280. There is also an upper support section 284 of wall 252 which is perpendicular to the above mentioned curved sections which is shown in solid lines in FIG. 14 and in phantom lines in FIG. 17.

Figure 18:
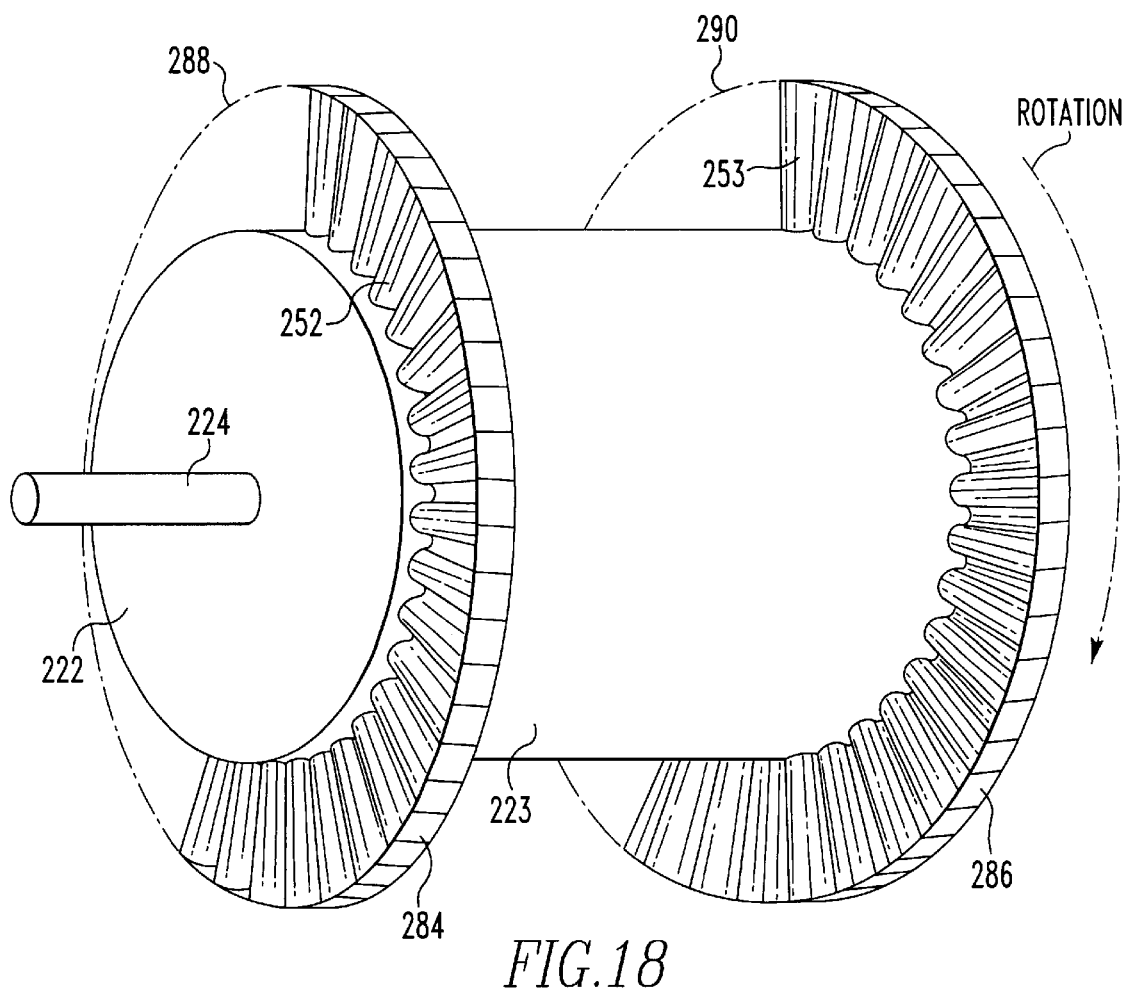
FIG. 18 is a front and side perspective view of the cylindrical drum and sinusoidal wall sections of the apparatus shown in FIG. 14.
Figure 19:
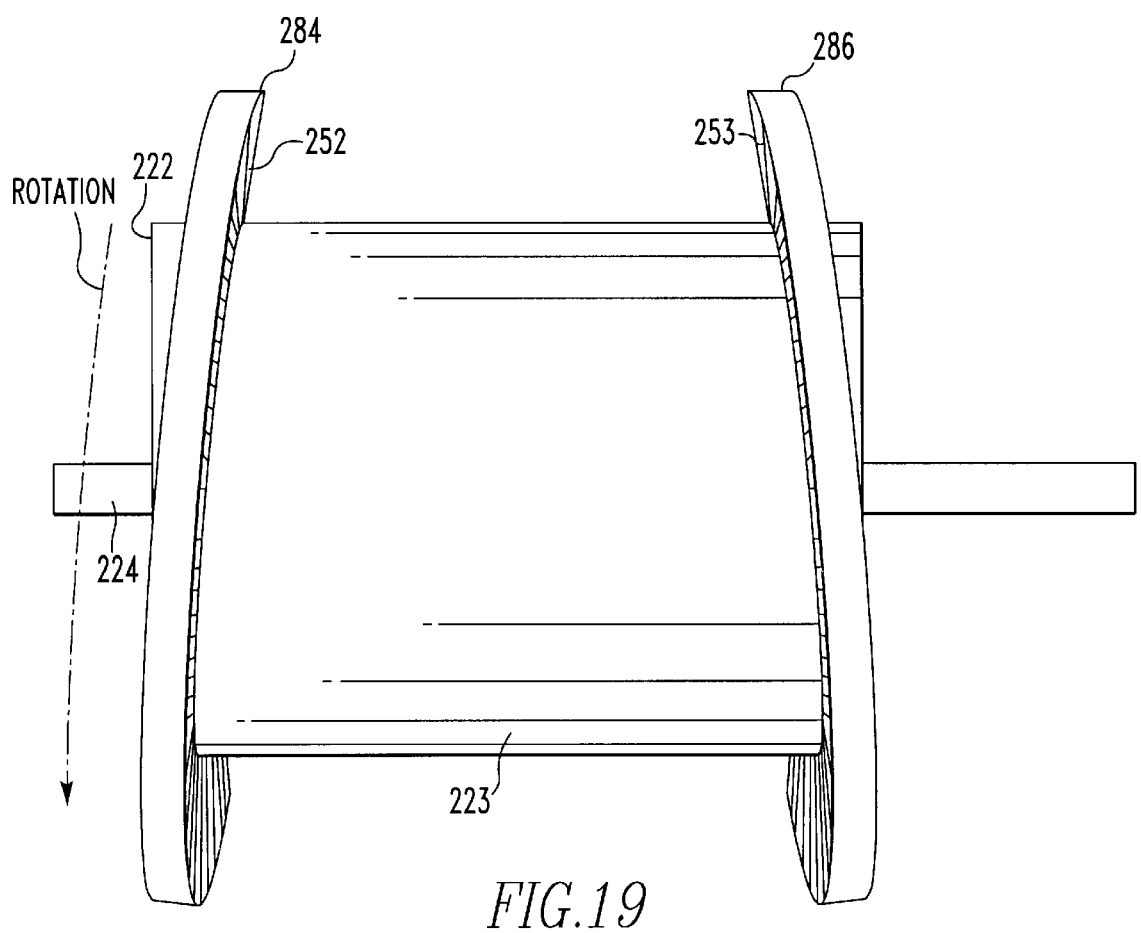
FIG. 19 is a front elevational view of the cylindrical drum and sinusoidal wall sections of the apparatus shown in FIG. 14.

Referring to FIGS. 18–19, the positioning of the sinusoidal walls 252 and 253 on the cylindrical drum 222 mounted on axle 224 is further illustrated. It will be seen that the walls 252 and 253 with their upper perpendicular supports 284 and 286 follow a generally helical pattern on the peripheral surface 223 of drum 224. Although the sinusoidal walls 252 and 253 extend in this embodiment only partially around the drum 222, it will be appreciated that for some uses it may be advantageous to have these sinusoidal walls extend completely around the drum or other cylindrical member. In such situations, each sinusoidal wall may be positioned so that its front end abuts its rear end to form a complete seal around the drum or other cylindrical member. Alternatively, each sinusoidal wall may be positioned in a helical pattern adjacent one of the ends of the drum or other cylindrical member and may be wrapped around the drum or other cylindrical member one or more times.

EXAMPLE 1

An apparatus made generally according to the description of FIGS. 1–5 was manufactured. The diameter of the drum was 36 inches and had an axial length of 50 inches. The peripheral surface of the drum was smooth rubber, lagged. Raw cane sugar having a density of about 50 lb/ft$^3$ and an angle of repose of from about 30° to about 44° was metered and fed by means of the apparatus. On the upper peripheral surface of the drum there was a particulate material receiving surface extending about 22 inches along the direction of rotation of the drum. The rear oblique plate was positioned in abutting relation to the peripheral surface of the drum. The front oblique plate was positioned so that its inner edge initially abutted the peripheral surface of the drum. The space between the front and rear oblique plates was filled with sugar to a depth of about 10 inches. The front oblique plates were withdrawn from the peripheral surface of the drum to accommodate the angle of repose of the sugar by variable distances to a maximum of 10⅜ inches. The design capacity was 350 tons/hr. with a required horsepower of 47 HP and supplied horsepower of 15 HP. The drum was rotated at 12 PRM to achieve a conveyed rate for the sugar of 14,000 ft³/hr.

The term "particulate material", as it is used wherein, means any material in the form of small solid particles or combinations of small solid particles and minor amounts of liquid. The term is intended to encompass pulverized, fragmented, or granular material. More specifically, the term includes, but is not limited to, those materials listed on Table 3-3 beginning on page 42 in *Belt Conveyors for Bulk Materials,* (Third Edition) prepared by the Engineering Conference of the Conveyor Equipment Manufacturers Association (1988), the contents of which are incorporated herein by reference.

The term "angle of repose", as it is used herein, means the maximum slope at which a generally conically shaped body of particulate material will stand without sliding, or will come to rest when poured or dumped in a pile or on a slope. Angles of repose for particular materials are listed in the aforesaid Table 3-3 of *Belt Conveyors for Bulk Materials.* Those skilled in the art will appreciate that angles of repose for particular materials may be reported within a range of angles as a result of differences in characteristics existing within such classes of materials, but that a specific angle of repose can be readily ascertained by conventional empirical procedures without undue experimentation.

It will also be appreciated by those skilled in the art that the various embodiments described above that, within the scope of the present invention, it would be possible to substitute a moving or moveable surface for the cylindrical drum. Preferably, such a moving or moveable surface might be a curved moving or moveable surface. An example of a suitable moving or moveable surface might by a continuous belt conveyor.

It will be appreciated that a feeding and metering apparatus has been described which allows adjustment of the apparatus to accommodate different materials to be done quickly and economically.

It will also be appreciated that an easy, inexpensive and effective means of sealing the lower edge of a particulate material sealing plate against a surface, particularly a curved surface has been described.

It will also be appreciated that an easy, inexpensive and effective means of sealing a rotating shaft, particularly with a cylindrical shaft, has been described.

Accordingly, the improved Apparatus and Method for Controlled Feeding of Particulate Material is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the Apparatus and Method for Controlled Feeding of Particulate Material is constructed and used, the characteristics of the construction, and the advantageous new and useful results obtained; the new and useful structures, devices, elements, arrangements, parts, and combinations are set forth in the appended claims.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An apparatus for feeding a particulate material comprising:

a drum having an extension peripheral surface and a longitudinal axis and being rotatable about said longitudinal axis;

a first particulate material retaining means extending from the drum in a generally radial direction and having an inner and outer edge and positioned such that said outer edge is remote from the peripheral surface of the drum and the inner edge is adjacent the peripheral surface of the drum, but wherein said inner edge of said first retaining means is movable radially and pivotally away from said peripheral surface of said drum;

a second particulate material retaining means extending from the drum in a generally radial direction and having an inner and outer edge and positioned such that said outer edge is remote from the peripheral surface of the drum and the inner edge is adjacent to the peripheral surface with the drum;

wherein the drum has an upper side and a particulate material receiving surface is interposed on said upper side between the first particulate material retaining means and the second particulate material retaining means, so that the particulate material is positioned on the particulate material receiving surface between the first and second particulate material retaining means and the first particulate material retaining means is movable from the peripheral surface of the drum by a distance such that a space is formed between the peripheral surface of the drum and the inner end of the first retaining means and said space is sufficiently large to allow the particulate material to flow between said peripheral surface and the inner end of the first retaining means, and the particulate material has an angle of repose and an upper center point and there is a tangent line between said upper center point and the peripheral surface of the drum along said angle of repose, and the distance by which the inner end of the first particulate material retaining means is movable from the peripheral surface of the drum is sufficient so that said inner edge is positioned approximately on said tangent line.

2. The apparatus of claim 1 wherein the first and second particulate material retaining means are separated through the particulate material receiving surface by an acute angle.

3. The apparatus of claim 1 wherein the drum is cylindrical.

4. The apparatus of claim 1 wherein the drum has opposed ends and there are spaced lateral retaining means adjacent said opposed ends.

5. The apparatus of claim 4 wherein the lateral retaining means are lateral walls.

6. The apparatus of claim 1 wherein the particulate material receiving surface has opposed lateral sides and there are spaced lateral retaining means adjacent each of said lateral sides.

7. The apparatus of claim 1 wherein a scrapper bears against the peripheral surface of the drum.

8. The apparatus of claim 1 wherein the second material retaining means is canted relative to the peripheral surface of the drum by an angle approximately equal to the angle of repose.

9. An apparatus for feeding a particulate material comprising:
   a rotatable drum having a direction of rotation, an exterior peripheral surface having an upper side and a longitudinal axis, and having a generally conically shaped body of particulate material positioned on said upper side of the peripheral surface and said generally conically shaped body of particulate material having an apex and a base, a sloped side and having a forward side in the direction or rotation of the drum and an opposed rearward side;
   a first particulate material retaining means extending from the drum in a generally radial direction and having an inner edge and an outer edge and being positioned such that said inner edge of said first particulate retaining means is spaced from the peripheral surface of the drum by a distance sufficient so that said inner edge is positioned approximately on the front sloped side of the conically shaped body of particulate material; and
   a second particulate material retaining means extending from the drum in a generally radial direction and having an inner edge and an outer edge and being positioned such that said inner edge of said second particulate material retaining means is adjacent the peripheral surface of the drum and said second particulate material retaining means is positioned in rearward relation to the apex of the conically shaped body of particulate material; and
   wherein the drum has an upper side and a particulate material receiving surface is interposed on said upper side between the first particulate material retaining means and the second particulate material retaining means, so that the particulate material is positioned on the particulate material receiving surface between the first and second particulate material retaining means and the first particulate material retaining means is movable from the peripheral surface of the drum by a distance such that a space is formed between the peripheral surface of the drum and the inner end of the first retaining means and said space is sufficiently large to allow the particulate material to flow between said peripheral surface and the inner end of the first retaining means, and the particulate material has an angle of repose and an upper center point and there is a tangent line between said upper center point and the peripheral surface of the drum along said angle of repose, and the distance by which the inner end of the first particulate material retaining means is radially and pivotally movable from the peripheral surface of the drum is sufficient so that said inner edge is positioned approximately on said tangent line.

10. The apparatus of claim 9 wherein the first particulate material retaining means is a first plate which extends from the drum in generally radial relation; and
    wherein the second particulate material retaining means is a second plate which extends from the drum in generally radial relation; and
    the first plate and second plate are separated through the particulate material receiving surface by an acute angle.

11. The apparatus of claim 9 wherein the drum in cylindrical.

12. The apparatus of claim 9 wherein the drum has opposed ends and there are spaced lateral retaining means adjacent said opposed ends.

13. The apparatus of claim 12 wherein the lateral retaining means are lateral walls.

14. The apparatus of claim 9 wherein the particulate material receiving surface has opposed lateral sides and there are spaced lateral retaining means adjacent each of said lateral sides.

15. The apparatus of claim 9 wherein a scrapper bears against the peripheral surface of the drum.

16. The apparatus of claim 9 wherein the particulate material has an angle of repose and the second material retaining means is canted relative to the peripheral surface of the drum by an angle approximately equal to the angle of repose.

17. An apparatus for feeding a particulate material comprising:
    a generally cylindrical drum having a peripheral surface having an upper side and a longitudinal axis, and having a body of a particulate material positioned on said upper side of said peripheral surface and said body of particulate material having a surface with a center point and a sloped line extending from said center point which is tangent to the peripheral surface of the drum or parallel to a line tangent to the peripheral surface of the drum, and there is a horizontal line parallel to a tangent to the peripheral surface of the drum which forms with the sloped line an acute angle, and said particulate material has an angle of repose which is approximately equal to said acute angle;
    a first particulate material retaining means having an inner edge and an outer edge and being positioned such that said inner edge of said first particulate retaining means is moveable both radially and pivotally away from the peripheral surface of the drum so as to be spaced from the peripheral surface of the drum by a distance sufficient so that said inner edge is positioned approximately on the sloped line extending from said center point of the surface of the particulate material which is tangent to the peripheral surface of the drum;
    a second particulate material retaining means positioned adjacent the body of particulate material in opposed relation to the first particulate material retaining means; and
    means for rotating the drum about its longitudinal axis in a direction from the center point of the surface of the center point of the surface of the particulate material toward the first particulate material retaining means.

18. A method for feeding a particulate material comprising:
    providing a rotatable drum having a direction of rotation, a peripheral surface having an upper side and a longitudinal axis, and having a conically shaped body of particulate material positioned on said upper side of the peripheral surface and said conically shaped body of particulate material having an apex and base, a sloped side and having a forward side in the direction of rotation of the drum and an opposed rearward side;
    providing a first particulate material retaining means having an inner edge and an outer edge and positioning said inner edge of said first particulate retaining means is movable both radially and pivotally away from the peripheral surface of the drum so as to be spaced from the peripheral surface of the drum by a distance sufficient so that said inner edge is positioned approximately on the front sloped side of the conically sloped body of particulate material; and providing a second particulate material retaining means having an inner edge and an outer edge and being positioned such that said inner edge of said second particulate material retaining means is adjacent the peripheral surface of the drum and said second particulate material retaining means is positioned in rearward relation to the apex of the conically sloped body of particulate material.

19. A method for feeding a particulate material comprising:

providing a generally cylindrical drum having a peripheral surface having an upper side and a longitudinal axis, and having a body of a particulate material positioned on said upper side of said peripheral surface and said body of particulate material having a surface with a center point and a sloped line extending from said center point which is tangent to the peripheral surface of the drum or parallel to a line tangent to the peripheral surface of the drum, and there is a horizontal line parallel to a tangent to the peripheral surface of the drum which forms with the sloped line an acute angle, and said particulate material has an angle of repose which is approximately equal to said acute angle;

providing a first particulate material retaining means having an inner edge and an outer edge and positioning said inner edge of said first particulate retaining means is moveable both radially and pivotally away from the peripheral surface of the drum so as to be spaced from the peripheral surface of the drum by a distance sufficient so that said inner edge is positioned approximately on the sloped line extending from said center point of the surface of the particulate material which is tangent to the peripheral surface of the drum;

providing a second particulate material retaining means positioned adjacent the body of particulate material in opposed relation to the first particulate material retaining means; and rotating the drum about its longitudinal axis in a direction from the center point of the surface of the center point of the surface of the particulate material toward the first particulate material retaining means.

20. An apparatus for feeding a particulate material comprising:

a moveable surface having a generally conically shaped body of particulate material positioned on said moveable surface and said generally conically shaped body of particulate material having an apex and base, a sloped side and having a forward side in the direction of rotation of the drum and an opposed rearward side;

a first particulate material retaining means having an inner edge and an outer edge and being positioned such that said inner edge of said first particulate retaining means is moveable both radially and pivotally away from the peripheral surface of the drum so as to be spaced from the moveable surface by a distance sufficient so that said inner edge is positioned approximately on the front sloped side of the conically sloped body of particulate material; and a second particulate material retaining means having an inner edge and an outer edge and being positioned such that said inner edge of said second particulate material retaining means is adjacent the peripheral surface of the drum and said second particulate material retaining means is positioned in rearward relation to the apex of the conically sloped body of particulate material.

21. An apparatus for feeding a particulate material comprising:

a curved moveable surface having a body of a particulate material positioned on said curved moveable surface and said body of particulate material having a surface with a center point and a sloped line extending from said center point which is tangent to the curved moveable surface and there is a horizontal line parallel to a tangent to the curved moveable surface which forms with the sloped line an acute angle, and said particulate material has an angle of repose which is approximately equal to said acute angle;

a first particulate material retaining means having an inner edge and an outer edge and being positioned such that said inner edge of said first particulate retaining means is moveable both radially and pivotally away from the peripheral surface of the drum so as to be spaced from the peripheral surface of the drum by a distance sufficient so that said inner edge is positioned approximately on the sloped line extending from said center point of the surface of the particulate material which is tangent to the curved moveable surface;

a second particulate material retaining means positioned adjacent the body of particulate material in opposed relation to the first particulate material retaining means; and means for moving the moveable surface in a direction from the center point of the surface of the particulate material toward the first particulate material retaining means.

22. A method for feeding a particulate material comprising:

providing a moveable surface having a direction of motion, and having a generally conically shaped body of particulate material positioned on said moveable surface and said conically shaped body of particulate material having an apex and base, a sloped side and having a forward side in the direction of rotation of the drum and an opposed rearward side;

providing a first particulate material retaining means having an inner edge and an outer edge and positioning said inner edge of said first particulate retaining means is moveable both radially and pivotally away from the peripheral surface of the drum so as to be spaced from the moveable surface by a distance sufficient so that said inner edge is positioned approximately on the front sloped side of the conically sloped body of particulate material; and providing a second particulate material retaining means having an inner edge and an outer edge and being positioned such that said inner edge of said second particulate material retaining means is adjacent the moveable surface and said second particulate material retaining means is positioned in rearward relation to the apex of the conically sloped body of particulate material.

23. A method for feeding a particulate material comprising:

providing a curved moveable surface, and having a body of a particulate material positioned on said moveable surface and said body of particulate material having a surface with a center point and a sloped line extending from said center point which is tangent to the curved moveable surface and there is a horizontal line parallel to a tangent to the peripheral surface of the drum which forms with the sloped line an acute angle, and said particulate material has an angle of repose which is approximately equal to said acute angle;

providing a first particulate material retaining means having an inner edge and an outer edge and positioning said inner edge of said first particulate retaining means is moveable both radially and pivotally away from the peripheral surface of the drum so as to be spaced from the curved moveable surface by a distance sufficient so that said inner edge is positioned approximately on the sloped line extending from said center point of the surface of the particulate material which is tangent to the curved moveable surface;

providing a second particulate material retaining means positioned adjacent the body of particulate material in opposed relation to the first particulate material retaining means; and moving the curved moveable surface in a direction from the center point of the surface of the particulate material toward the first particulate material retaining means.

* * * * *